United States Patent
Nguyen et al.

(10) Patent No.: US 10,884,834 B2
(45) Date of Patent: Jan. 5, 2021

(54) INVOKING APPLICATION PROGRAMMING INTERFACES ACROSS ISOLATED PARTS OF A WEB APPLICATION

(71) Applicant: Microsoft Technology Licensing, LLC, Redmond, WA (US)

(72) Inventors: John G. Nguyen, Redmond, WA (US); Srikanth Deshpande, Redmond, WA (US); Patrick C Miller, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/286,390

(22) Filed: Feb. 26, 2019

(65) Prior Publication Data
US 2020/0097346 A1 Mar. 26, 2020

Related U.S. Application Data

(60) Provisional application No. 62/735,526, filed on Sep. 24, 2018.

(51) Int. Cl.
*G06F 9/54* (2006.01)

(52) U.S. Cl.
CPC .............. *G06F 9/548* (2013.01); *G06F 9/546* (2013.01)

(58) Field of Classification Search
None
See application file for complete search history.

(56) References Cited

U.S. PATENT DOCUMENTS

| | | |
|---|---|---|
| 8,156,441 B1 | 4/2012 | Bihari et al. |
| 8,250,082 B2 | 8/2012 | Gwozdz et al. |
| 8,799,988 B2 | 8/2014 | Conlan et al. |
| 8,887,182 B2 | 11/2014 | Low et al. |
| 9,491,061 B1 | 11/2016 | Nizametdinov et al. |
| 2008/0177845 A1* | 7/2008 | Bracewell ............... H04L 51/22 709/206 |
| 2009/0328063 A1 | 12/2009 | Corvera et al. |
| 2012/0047517 A1 | 2/2012 | Townsend et al. |
| 2017/0256003 A1* | 9/2017 | Isaacson ................ G06Q 50/01 |
| 2018/0052809 A1 | 2/2018 | Nguyen et al. |
| 2018/0278928 A1* | 9/2018 | De La Paz ............... H04N 7/15 |

OTHER PUBLICATIONS

"International Search Report and Written Opinion Issued in PCT Application No. PCT/US19/039117", dated Oct. 9, 2019,11 Pages.

(Continued)

*Primary Examiner* — Craig C Dorais
(74) *Attorney, Agent, or Firm* — Schwegman Lundberg & Woessner, P.A.

(57) ABSTRACT

A secured method for isolated parts of a web application to invoke APIs across boundaries is described. A host web page receives a first object from a first inline frame of the host web page. The first object identifies a first Application Programming Interface (API). The host web page validates the first object against a predefined APIs for the host web page. Once the first object is validated, the host web page forwards the first object to a second inline frame of the host web page. The second inline frame parses the first object and translate the parsed first object to a second API corresponding to the second inline frame.

18 Claims, 9 Drawing Sheets

(56) References Cited

OTHER PUBLICATIONS

"Window.postMessage()", Retrieved from <<https://developer.mozilla.org/en-US/docs/Web/API/Window/postMessage>>, Retrieved on: Jan. 22, 2019, 7 Pages.
Austin, et al., "Cross-domain IFRAME", Retrieved from <<https://docs.microsoft.com/en-us/skype-sdk/ucwa/cross_domainiframe>>, Apr. 27, 2018, 3 Pages.

* cited by examiner

INVOKING APPLICATION PROGRAMMING INTERFACES ACROSS ISOLATED PARTS OF A WEB APPLICATION

CROSS-REFERENCE TO RELATED APPLICATIONS

The present application claims priority from Provisional Patent Application Ser. No. 62/735,526, filed on Sep. 24, 2018, and incorporated in its entirety herewith.

TECHNICAL FIELD

The subject matter disclosed herein generally relates to a special-purpose machine that provides a mechanism for two iframe of a web page to communicate, including computerized variants of such special-purpose machines and improvements to such variants, and to the technologies by which such special-purpose machines become improved compared to other special-purpose machines that provide non-executable code in messages between an iframe and its host. Specifically, the present disclosure addresses systems and methods to communicate executable functions between iframes and between an iframe and its host.

BACKGROUND

The HTML Document Object Model (DOM) defines a set of standard elements for making web pages. The "<iframe>" is one of such elements, which instructs a web browser to load a different ("embedded") web page inside a specified rectangle appearing on the outer ("host") web page. The embedded web page is isolated from the host web page. For example, program scripts from the embedded web page are generally prohibited from communicating with scripts from the host page, and from enforcing security in situations where the embedded web page may not be trusted.

The HTML5 specification further provides a messaging system where an iframe and its host can communicate through the postMessage API. Messages sent through postMessage can include structured objects. However, these structured objects cannot contain executable code and consist of JavaScript primitives or further nested structured objects. Thus, an iframe cannot use the postMessage API to communicate to other iframes embedded in the host.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
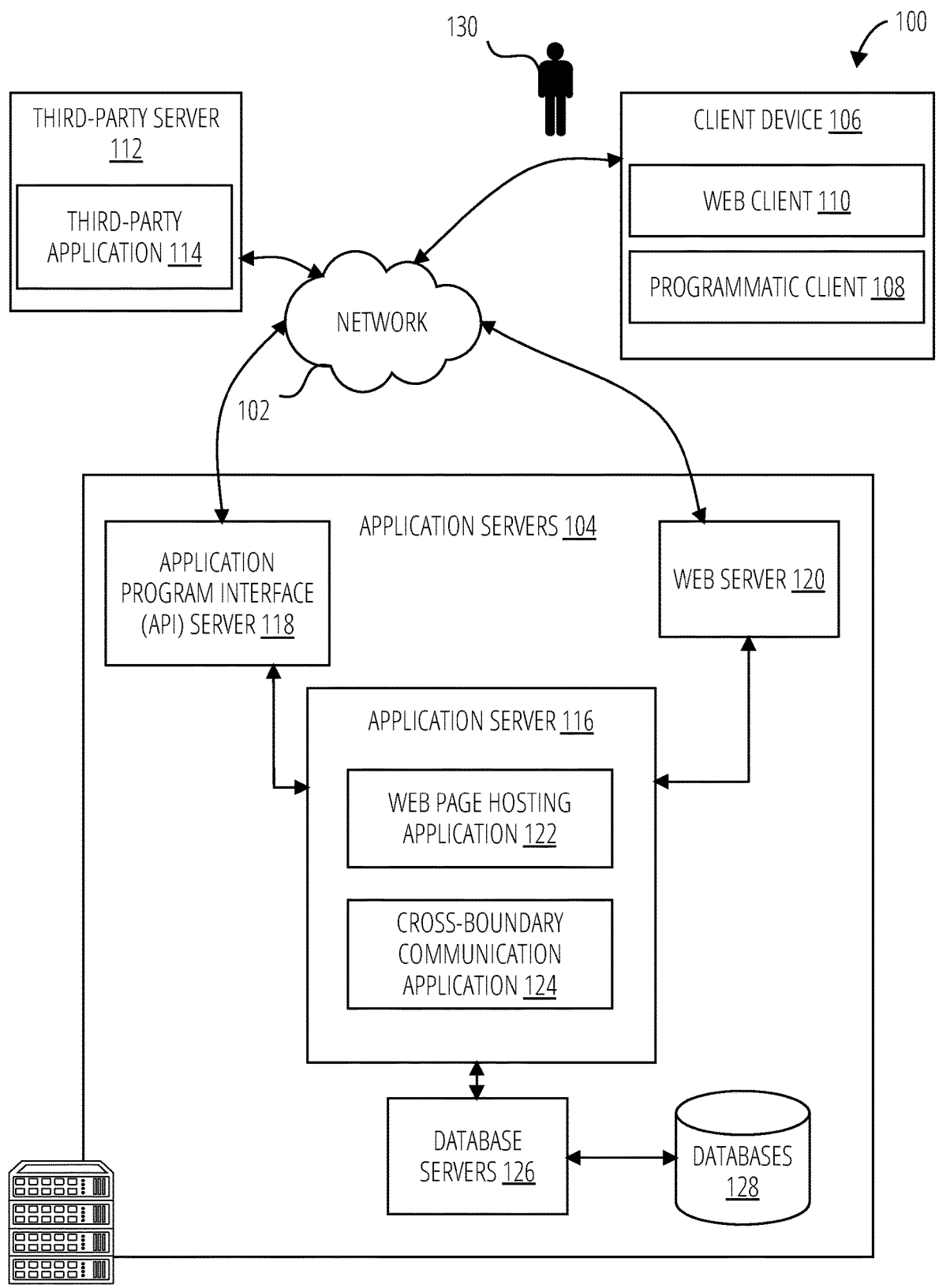
FIG. 1 is a diagrammatic representation of a networked environment in which the present disclosure may be deployed, in accordance with some example embodiments.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"iframe (inline frame)" refers to an HTML document embedded inside another HTML document on a website. The iFrame HTML element can be used to insert content from another source.

"Framework" refers to a SharePoint Framework (SPFx) that is a page and extension model that enables client-side development for building SharePoint experiences.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Microsoft's SharePoint product provides the ability to host interactive widgets (e.g., SharePoint Client-Side Web Parts). Web parts can be hosted in a secure mode, which will render the web part inside of an inline frame (also referred to as iframe) on a page hosted in SharePoint. A web part in an iframe is not able to affect the host page. SharePoint web parts can be configured using a configuration panel ("Property Pane"), which is a part of the host page. A web part in secure mode has the Property Pane rendered inside of a separate iframe instead of the host page. The current framework for web part to Property Pane, and vice-versa, communication is through APIs exposed between the two iframes.

The web part in secure mode needs to be able to use these same APIs but current communication models do not provide a mechanism for two iframes to communicate (potentially cross-origin). Executable functions cannot be passed between an iframe and its host or between two iframes. The present application describes a solution that provides the following features:

a web part and Property Pane are rendered in two separate iframes and may not have the same origin.

a web part can use the current set of Property Pane API and vice-versa (e.g., a web part in secure mode does not behave differently than the same web part not rendered in secure mode).

the communication channel is secure, declarative, and does not involve global variables.

In one example embodiment, the present application describes examples of establishing a secure communication channel between two iframes on a web page, invoking the same APIs in and out of an iframe with the same behavior, one iframe safely invoking APIs in another iframe, and a host safely invoking APIs in an iframe and vice-versa.

In one example embodiment, the present application describes a secured method for isolated parts of a web application to invoke APIs across boundaries is described. A host web page receives a first object from a first inline frame of the host web page. The first object identifies a first Application Programming Interface (API). The host web page validates the first object against a predefined APIs for the host web page. Once the first object is validated, the host web page forwards the first object to a second inline frame of the host web page. The second inline frame parses the first object and translate the parsed first object to a second API corresponding to the second inline frame.

As a result, one or more of the methodologies described herein facilitate solving the technical problem of invoking APIs across boundaries. As such, one or more of the methodologies described herein may obviate a need for certain efforts or computing resources that otherwise would be involved in passing executable functions between an iframe and its host or between two iframes. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed.

One or more application servers 104 provide server-side functionality via a network 102 to a networked user device, in the form of a client device 110. A web client 110 (e.g., a browser) and a programmatic client 108 (e.g., an "app") are hosted and execute on the web client 110.

An Application Program Interface (API) server 118 and a web server 120 provide respective programmatic and web interfaces to application servers 104. A specific application server 116 hosts a web page hosting application 122 (e.g., Microsoft Sharepoint™) and a cross-boundary communication application 124 which includes components, modules and/or applications.

The web client 110 communicates with the web page hosting application 122 via the web interface supported by the web server 120. Similarly, the programmatic client 108 communicates with the web page hosting application 122 via the programmatic interface provided by the Application Program Interface (API) server 118. The third-party application 114 may, for example, be a service application that provides services to the client device 106. The web page hosting application 122 provides a host web page with service applications to the web client 110 of the client device 106. The cross-boundary communication application 124 enables a web part in one iframe of the host web page to communicate with another web part in another iframe of the host web page.

The application server 116 is shown to be communicatively coupled to database servers 126 that facilitates access to an information storage repository or databases 128. In an example embodiment, the databases 128 includes storage devices that store information to be published and/or processed by the web page hosting application 122.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
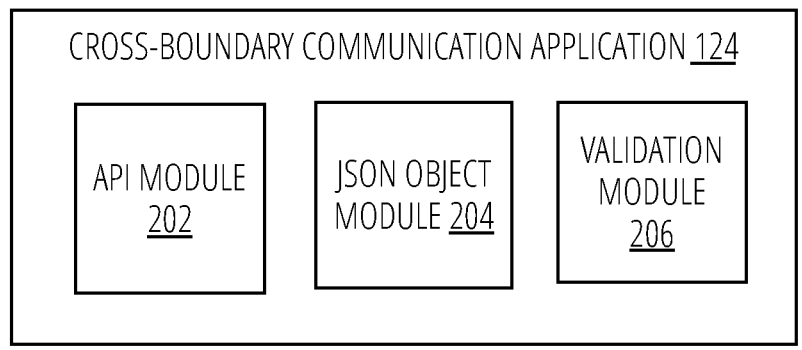
FIG. 2 is a block diagram illustrating a cross-boundary application in accordance with one example embodiment.

FIG. 2 illustrates the cross-boundary communication application 124 in accordance with one example embodiment. The cross-boundary communication application 124 includes an API module 202, a JSON object module 204, and a validation module 206. The API module 202 establishes a list of pre-defined APIs the host can use to validate message requests from iframes. The JSON object module 204 detects that an API is invoked in a first iframe of a host web page. The JSON object module 204 constructs an object describing the invoked API from the first iframe and provides arguments, if any, for the function invocation.

The following code illustrates an example of function invocation:

```
{
"foobar": {
"type": "__function__",
"name": "foobarFunctionName",
"args": {
...
}
}
```

In another example embodiment, the client device 106 includes the JSON object module 204 and constructs the object.

The first iframe sends the objects to the host web page. The host web page then validates the object against pre-defined or known APIs. In one example embodiment, the validation module 206 validates the object against the known API signatures from API module 202. Once the validation module 206 validates the object, the host web page passes the object to a second iframe of the host web page. The framework in the second iframe parses the object and translates it to the corresponding API invocation with the provided arguments, if any.

In another example embodiment, if there is a result that needs to be communicated back to the first iframe, the framework in the second iframe constructs an object describing the result and sends the object as a message to the host web page. The host web page validates the response and then sends it back to the first iframe.

Figure 3:
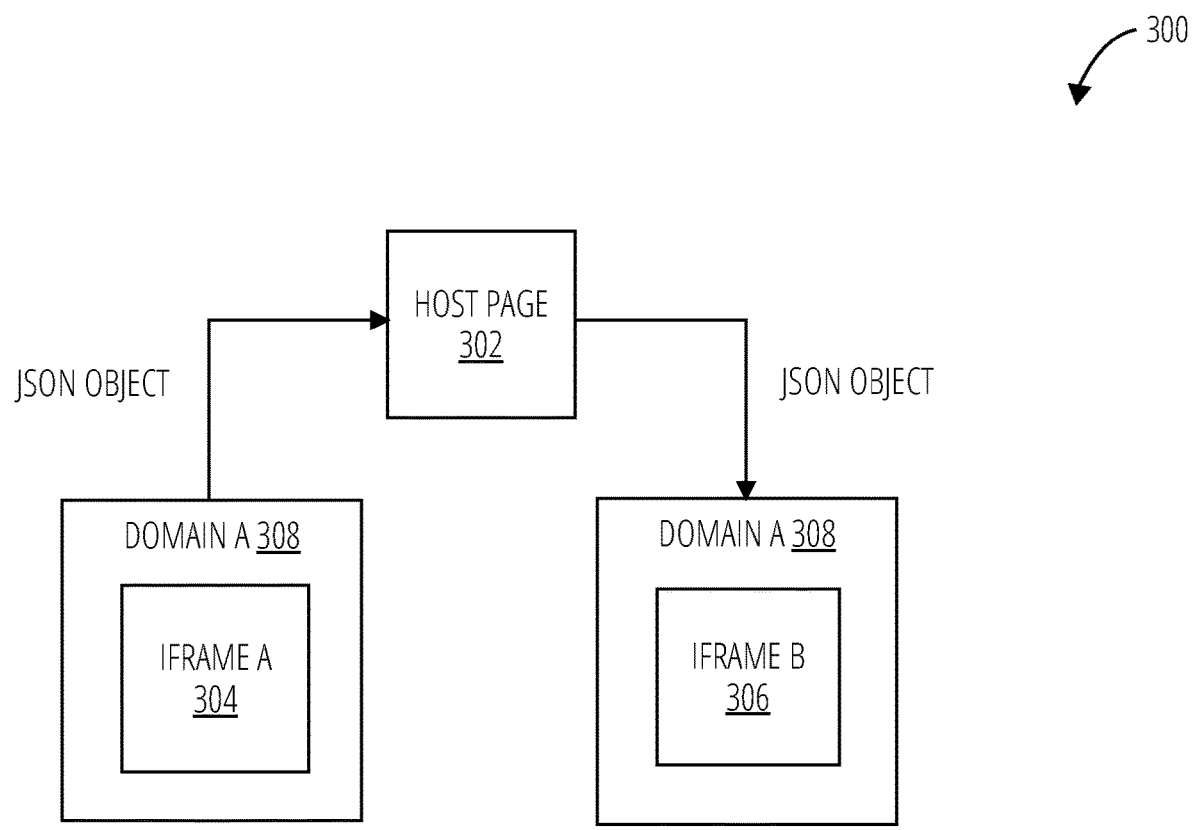
FIG. 3 is a block diagram illustrating an example operation of the cross-boundary application in accordance with one example embodiment.

FIG. 3 illustrates an example operation of the cross-boundary application in accordance with one example embodiment. The iframe A 304 sends a JSON object denoting functional calls that are targeted at the iframe B 306. The host page 302 intercepts the JOSN object and sends it to the targeted iframe (second iframe B 306) with all the same data to process the JSON object. The iframe B 306 receives and processes the JSON object. In particular, the iframe B 306 looks for the pre-defined notation for functional callbacks. Once the iframe B 306 validates the pre-defined notation for functional callback, the iframe B 306 forms a same API as invoked in the iframe A 304. It is noted that the iframe A 304 and the iframe B 306 are on the same domain A 308. The host (e.g., host page 302) is on a different domain. In another example embodiment, the iframe A 304 and iframe B 306 are from different domains.

Figure 4:
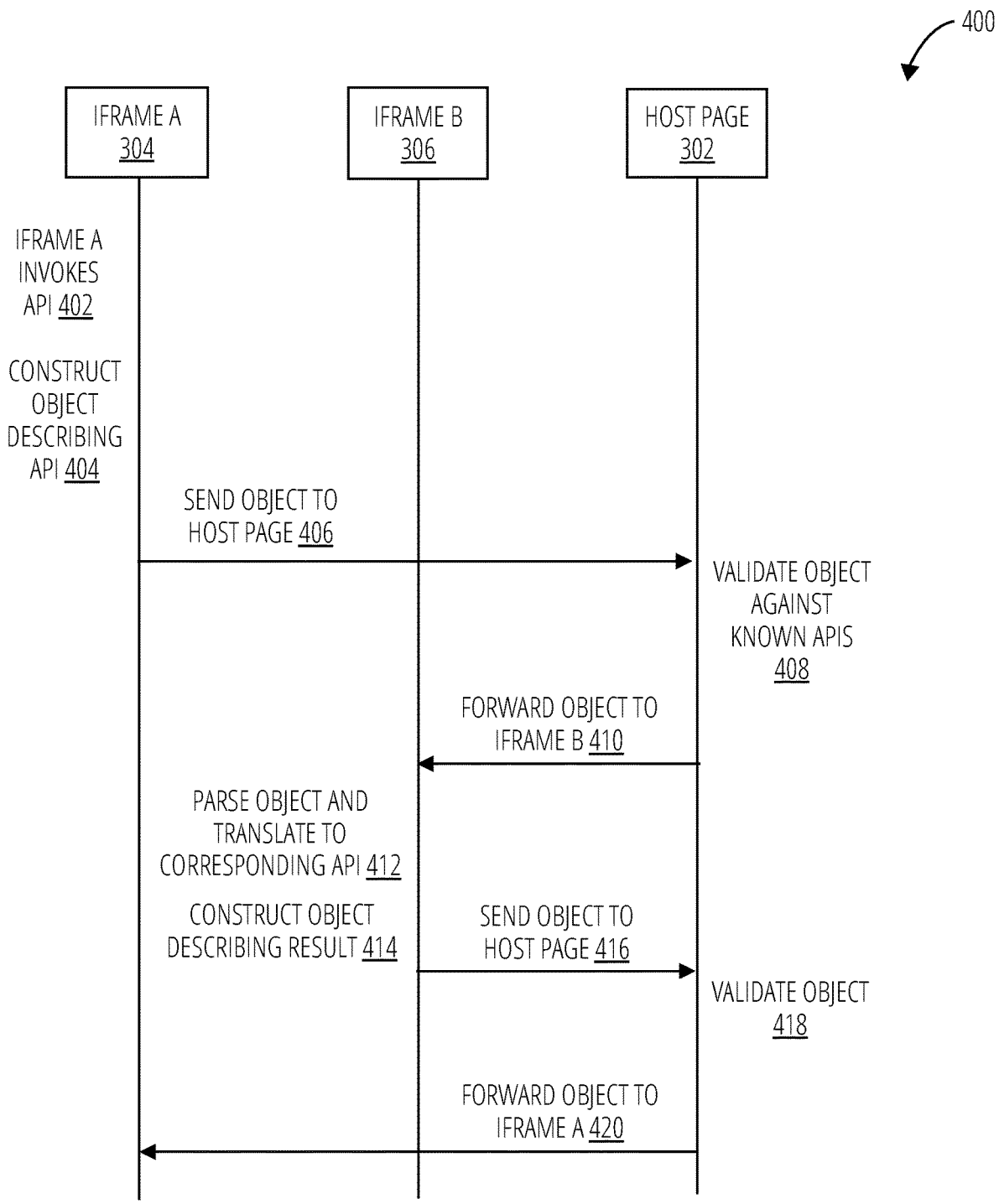
FIG. 4 is a sequence diagram illustrating an example operation of the cross-boundary application in accordance with one example embodiment.

FIG. 4 is a sequence diagram 400 illustrating an example operation of the cross-boundary application in accordance with one example embodiment. At operation 402, an API is invoked in iframe A 304. At operation 404, the framework of the web host page constructs an object describing the API and optionally provides arguments for the function invocation. The "framework" may refer to a web page sharing model (such as Microsoft's SharePoint Framework™). At operation 406, the iframe A 304 sends the object to the host page 302. At operation 408, the host page 302 validates the object against known or predefined APIs. At operation 410, once the host page 302 has validated the object, the host page 302 forwards the object to iframe B 306. At operation 412, the iframe B 306 parsed the object and translates the object to a corresponding API invocation with the provided arguments (if any). At operation 414, the iframe B 306 constructs an object describing the result of the API invocation. At operation 416, the iframe B 306 sends the object or a message containing the object to the host page 302. At operation 418, the host page 302 validates the object received from iframe B 306. At operation 420, the host page 302 forwards the object to the iframe A 304.

Figure 5:
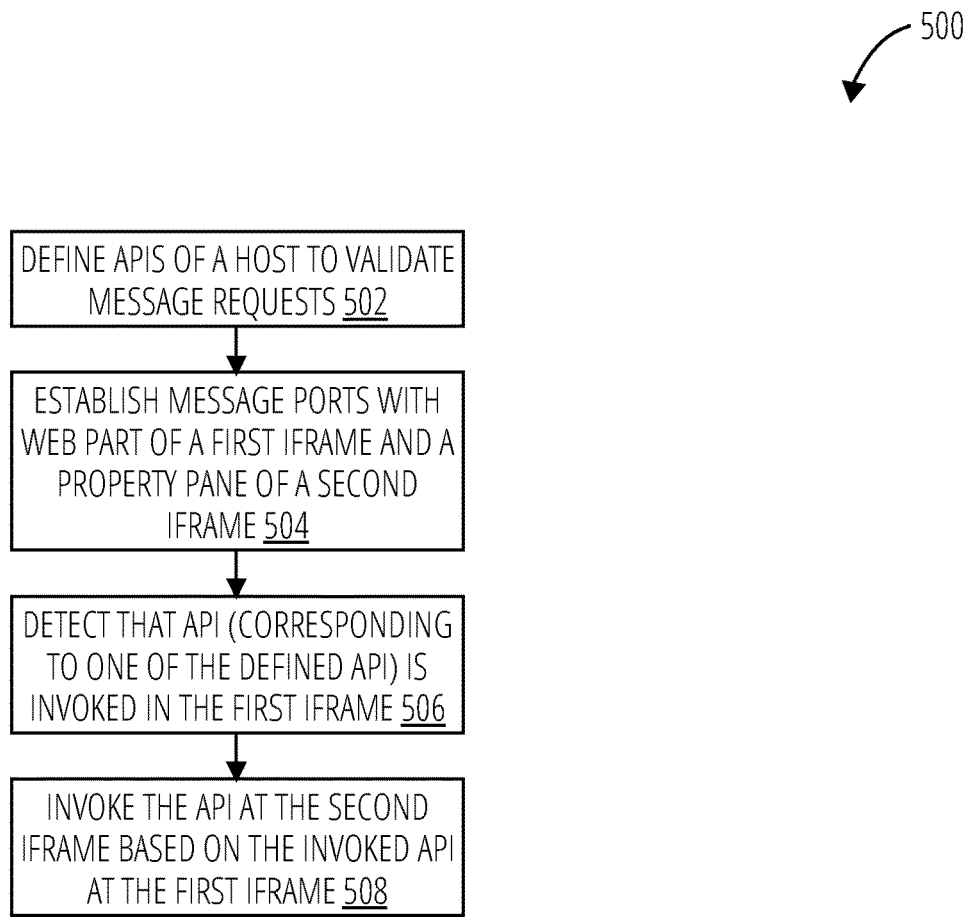
FIG. 5 is a flow diagram illustrating a method for communicating an API across boundaries in accordance with one example embodiment.

FIG. 5 illustrates a method 500 for communicating an API across boundaries in accordance with one example embodiment. Operations in the method 500 may be performed by the cross-boundary communication application 124, or the web page hosting application 122, using components (e.g., modules, engines) described above with respect to FIG. 2. Accordingly, the method 500 is described by way of example with reference to the cross-boundary communication application 124. However, it shall be appreciated that at least some of the operations of the method 500 may be deployed on various other hardware configurations or be performed by similar components residing elsewhere. For example, some of the operations may be performed at the web page hosting application 122 or the third-party application 114.

At block 502, the API module 202 defines a plurality of APIs of a host to validate message requests from iframes. At block 504, the cross-boundary communication application 124 establishes message ports with web parts of a first iframe and a property pane of a second iframe. At block 506, the validation module 206 detects that an API (corresponding to one of the predefined APIs) is invoked in the first iframe. At block 508, the host page 302 invokes, at the second iframe, an API corresponding to the API invoked in the first iframe. In another example embodiment, the host page 302 invokes an API at the second iframe based on the invoked API at the first iframe.

Figure 6:
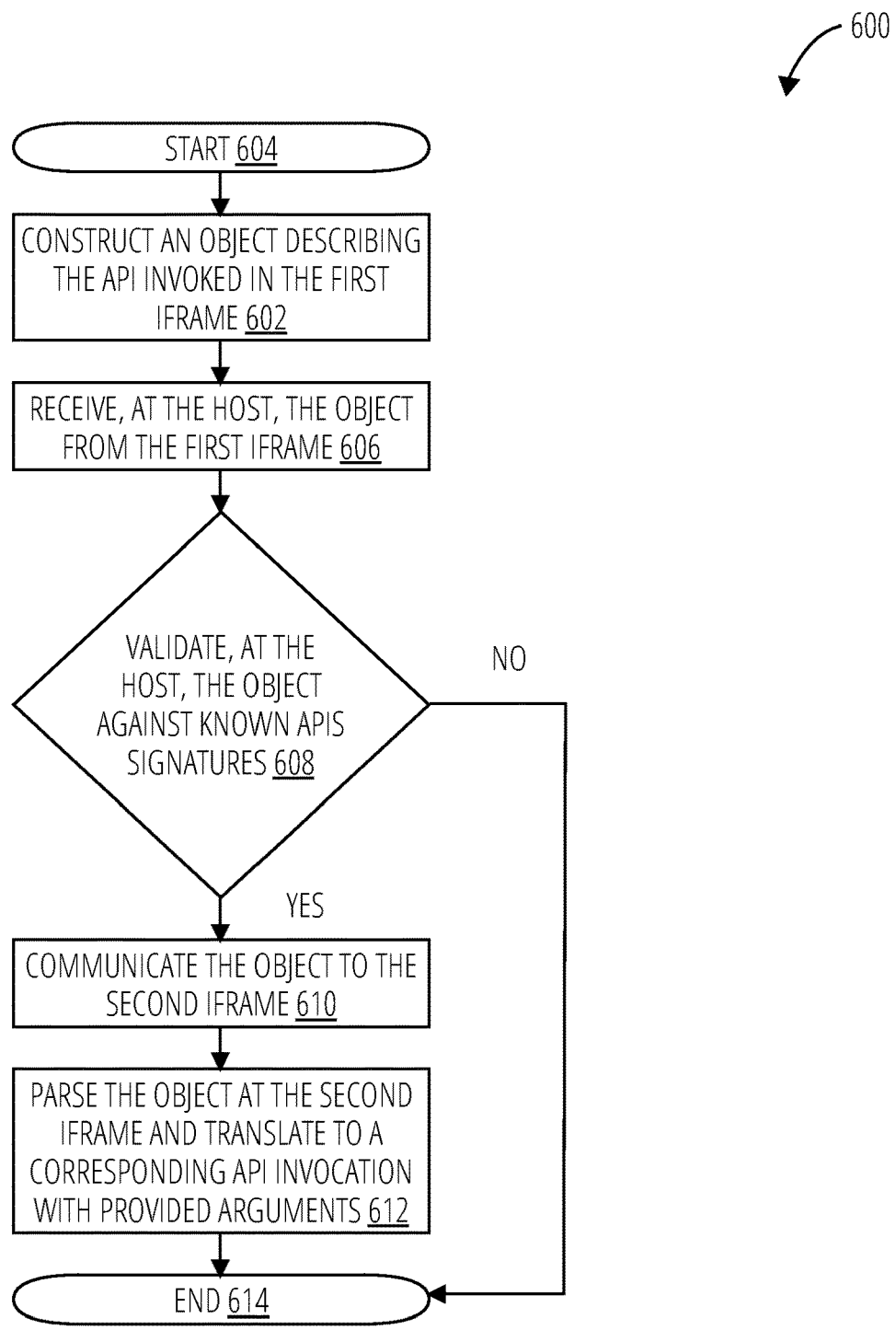
FIG. 6 is a flow diagram illustrating a method for invoking an API at a second iframe in accordance with one example embodiment.

FIG. 6 illustrates a method 600 for invoking an API at a second iframe in accordance with one example embodiment. Operations in the method 600 may be performed by the cross-boundary communication application 124, or the web page hosting application 122, using components (e.g., modules, engines) described above with respect to FIG. 2. Accordingly, the method 600 is described by way of example with reference to the cross-boundary communication application 124. However, it shall be appreciated that at least some of the operations of the method 600 may be deployed on various other hardware configurations or be performed by similar components residing elsewhere. For example, some of the operations may be performed at the web page hosting application 122 or the third-party application 114.

The method 600 starts at start block 604 and ends at end block 614. At block 602, the JSON object module 204 construct an object describing the API invoked in the first iframe. At block 606, the host receives the object from the first iframe. At decision block 608, the host validates the object against known APIs signatures. If the object is validated at decision block 608, the host communicates the object to the second iframe at block 610. If the object is not validated at decision block 608, the method 600 ends end block 614. At block 612, the second iframe parses the object and translates the object to a corresponding API invocation with provided arguments (if any).

Figure 7:
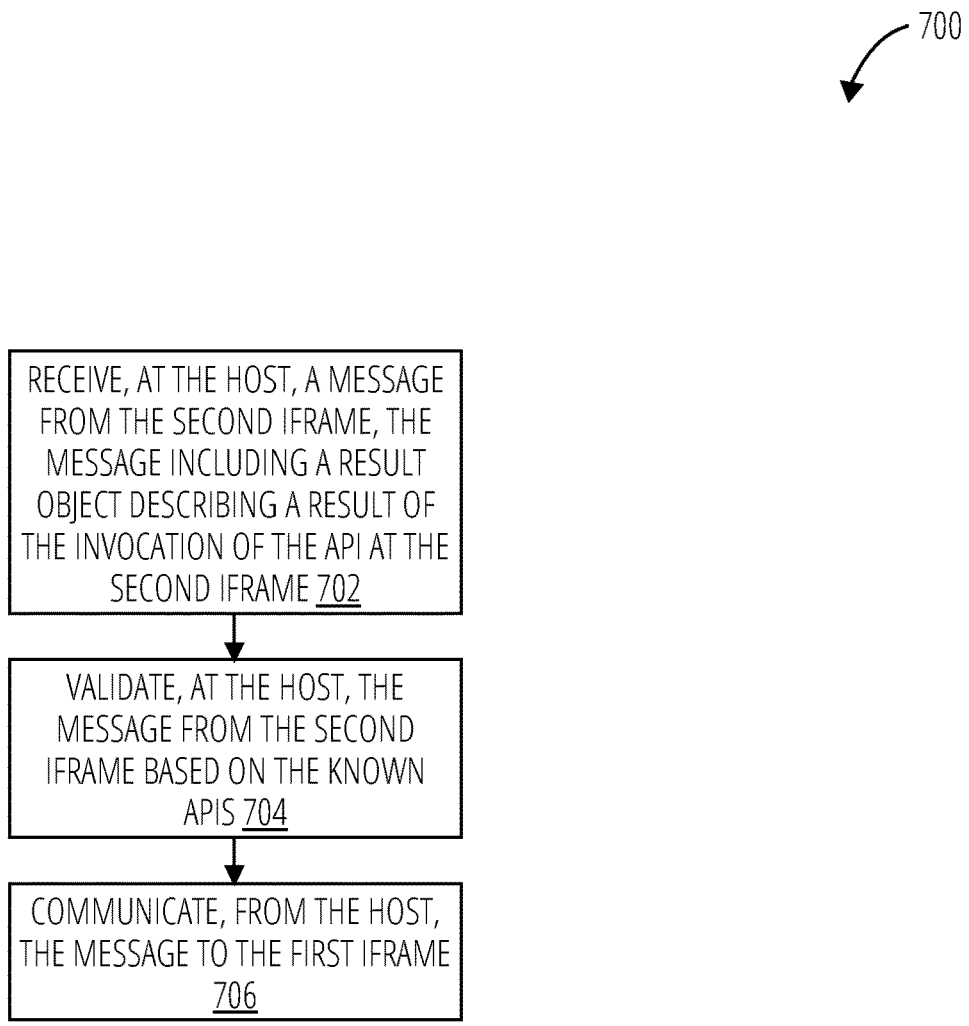
FIG. 7 is a flow diagram illustrating a method for communicating results from an API invoked at a second iframe back to a first iframe in accordance with one embodiment.

FIG. 7 illustrates a method 700 for communicating results from an API invoked at a second iframe back to a first iframe in accordance with one embodiment. Operations in the method 700 may be performed by the cross-boundary communication application 124, or the web page hosting application 122, using components (e.g., modules, engines) described above with respect to FIG. 2. Accordingly, the method 700 is described by way of example with reference to the cross-boundary communication application 124. However, it shall be appreciated that at least some of the operations of the method 700 may be deployed on various other hardware configurations or be performed by similar components residing elsewhere. For example, some of the operations may be performed at the web page hosting application 122 or the third-party application 114.

At block 702, the host receives a message from the second iframe. The message includes a result object describing a result of the invocation of the API at the second iframe. At block 704, the host validates the message from the second iframe based on the known APIs. At block 706, the host communicates the message to the first iframe.

Figure 8:
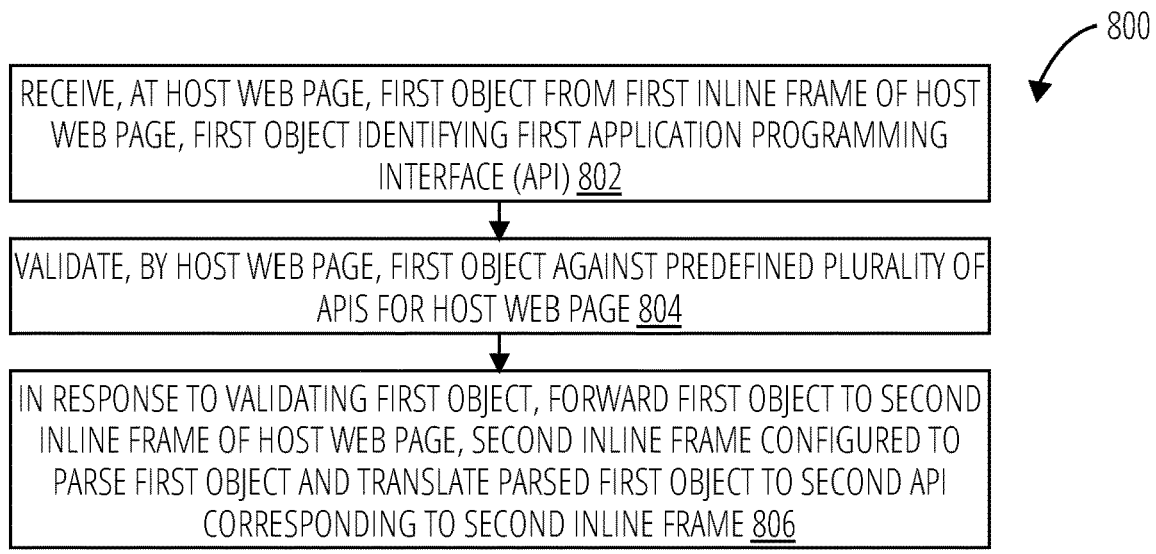
FIG. 8 illustrates a routine in accordance with one embodiment.

FIG. 8 illustrates a routine 800 in accordance with one embodiment. In block 802, routine 800 receives, at a host web page, a first object from a first inline frame of the host web page, the first object identifying a first Application Programming Interface (API). In block 804, routine 800 validates, by the host web page, the first object against a predefined plurality of APIs for the host web page. In block 806, routine 800 in response to validating the first object, forwards the first object to a second inline frame of the host web page, the second inline frame configured to parse the first object and translate the parsed first object to a second API corresponding to the second inline frame.

Figure 9:
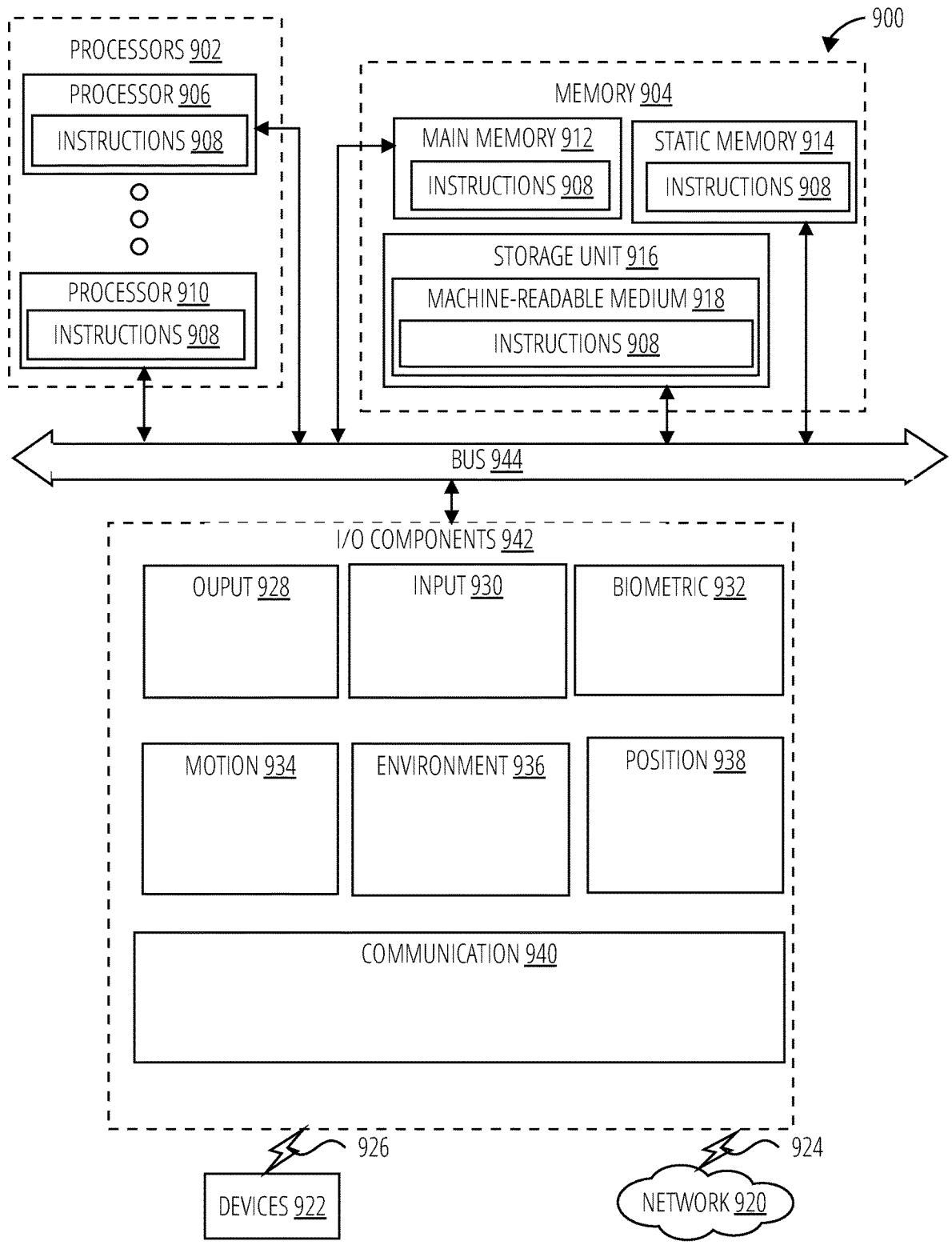
FIG. 9 is a diagrammatic representation of a machine in the form of a computer system within which a set of instructions may be executed for causing the machine to perform any one or more of the methodologies discussed herein, according to an example embodiment.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various example embodiments, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, and/or memory of the processors 902) and/or storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed embodiments.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a computer-implemented method, comprising: receiving, at a host web page, a first object from a first inline frame of the host web page, the first object identifying a first Application Programming Interface (API); validating, by the host web page, the first object against a predefined plurality of APIs for the host web page; and in response to validating the first object, forwarding the first object to a second inline frame of the host web page, the second inline frame configured to parse the first object and translate the parsed first object to a second API corresponding to the second inline frame.

In example 2, the subject matter of example 1 further comprising: receiving a message from the second inline frame, the message comprising a second object describing a result of the second API invoked in the second inline frame; validating the message at the host web page; and in response to validating the message, forwarding the message to the first inline frame.

In example 3, the subject matter of example 2, wherein the first inline frame comprises a web part item, the web part item comprising a server-side controlled application operating within the first inline frame, and wherein the second inline frame comprises a configuration pane of the host web page, the configuration pane configured to be rendered inside the second inline frame.

In example 4, the subject matter of example 1, wherein the first inline frame includes a first web part item configured to operate within the first inline frame, and wherein the second inline frame includes a second web part item configured to operate within the second inline frame.

In example 5, the subject matter of example 1, further comprising: establishing a first message port between the host web page and the first inline frame; and forming a second message port between the host web page and the second inline frame.

In example 6, the subject matter of example 1, wherein the first object further comprises arguments for invoking a function corresponding to the first API, and wherein the second inline frame is configured to parse the first object and translate the first object to the second API, with the arguments from the first object.

In example 7, the subject matter of example 1, wherein a framework of the first inline frame at the host web page is configured to construct the first object in response to the first inline frame invoking the first API.

In example 8, the subject matter of example 2, wherein a framework of the second inline frame at the host web page is configured to construct the second object in response to the second API being invoked at the second inline frame.

In example 9, the subject matter of example 1, further comprising: forming a list of the predefined plurality of APIs that can be used to validate requests from the first inline frame.

In example 10, the subject matter of example 1, further comprising: defining a plurality of common Application Programming Interfaces (APIs) for a plurality of hosts, the API configured to validate messages requests between the plurality of hosts; establishing a message port with a web part of the first inline frame and a property pane of the second inline frame; detecting that an API from the plurality of common APIs is invoked at the first inline frame; and invoking the API at the second inline frame based on the invoked API at the first inline frame.

What is claimed is:
1. A computer-implemented method, comprising:
receiving, at a host web page, a first object from a first inline frame of the host web page, the first object identifying a first Application Programming Interface (API);
validating, by the host web page, the first object against a predefined plurality of APIs for the host web page; and
in response to validating the first object, forwarding the first object to a second inline frame of the host web page, the second inline frame configured to parse the first object and translate the parsed first object to a second API corresponding to the second inline frame,
wherein the first inline frame comprises a web part item, the web part item comprising a server-side controlled application operating within the first inline frame, and wherein the second inline frame comprises a configuration pane of the host web page, the configuration pane configured to be rendered inside the second inline frame.

2. The computer-implemented method of claim 1, further comprising:
receiving a message from the second inline frame, the message comprising a second object describing a result of the second API invoked in the second inline frame;
validating the message at the host web page; and
in response to validating the message, forwarding the message to the first inline frame.

3. The computer-implemented method of claim 1,
wherein the first inline frame includes a first web part item configured to operate within the first inline frame, and
wherein the second inline frame includes a second web part item configured to operate within the second inline frame.

4. The computer-implemented method of claim 1, further comprising:
establishing a first message port between the host web page and the first inline frame; and
forming a second message port between the host web page and the second inline frame.

5. The computer-implemented method of claim 1, wherein the first object further comprises arguments for invoking a function corresponding to the first API, and
wherein the second inline frame is configured to parse the first object and translate the first object to the second API, with the arguments from the first object.

6. The computer-implemented method of claim 1, wherein a framework of the first inline frame at the host web page is configured to construct the first object in response to the first inline frame invoking the first API.

7. The computer-implemented method of claim 2, wherein a framework of the second inline frame at the host web page is configured to construct the second object in response to the second API being invoked at the second inline frame.

8. The computer-implemented method of claim 1, further comprising:
forming a list of the predefined plurality of APIs that can be used to validate requests from the first inline frame.

9. The computer-implemented method of claim 1, further comprising:
defining a plurality of common Application Programming Interfaces (APIs) for a plurality of hosts, the API configured to validate messages requests between the plurality of hosts;
establishing a message port with the web part item of the first inline frame and a property pane of the second inline frame;
detecting that an API from the plurality of common APIs is invoked at the first inline frame; and
invoking the API at the second inline frame based on the invoked API at the first inline frame.

10. A computing apparatus, the computing apparatus comprising:
a processor; and
a memory storing instructions that, when executed by the processor, configure the apparatus to:
receive, at a host web page, a first object from a first inline frame of the host web page, the first object identifying a first Application Programming Interface (API);
validate, by the host web page, the first object against a predefined plurality of APIs for the host web page; and
in response to validating the first object, forward the first object to a second inline frame of the host web page, the second inline frame configured to parse the first object and translate the parsed first object to a second API corresponding to the second inline frame,
wherein the first inline frame comprises a web part item, the web part item comprising a server-side controlled application operate within the first inline frame, and
wherein the second inline frame comprises a configuration pane of the host web page, the configuration pane configured to be rendered inside the second inline frame.

11. The computing apparatus of claim 10, wherein the instructions further configure the apparatus to:
receive a message from the second inline frame, the message comprising a second object describing a result of the second API invoked in the second inline frame;
validate the message at the host web page; and
in response to validating the message, forward the message to the first inline frame.

12. The computing apparatus of claim 10,
wherein the first inline frame includes a first web part item configured to operate within the first inline frame, and
wherein the second inline frame includes a second web part item configured to operate within the second inline frame.

13. The computing apparatus of claim 10, wherein the instructions further configure the apparatus to:
establish a first message port between the host web page and the first inline frame; and
form a second message port between the host web page and the second inline frame.

14. The computing apparatus of claim 10, wherein the first object further comprises arguments for invoking a function corresponding to the first API, and
wherein the second inline frame is configured to parse the first object and translate the first object to the second API, with the arguments from the first object.

15. The computing apparatus of claim 10, wherein a framework of the first inline frame at the host web page is configured to construct the first object in response to the first inline frame invoke the first API.

16. The computing apparatus of claim 11, wherein a framework of the second inline frame at the host web page is configured to construct the second object in response to the second API being invoked at the second inline frame.

17. The computing apparatus of claim 10, wherein the instructions further configure the apparatus to:
form a list of the predefined plurality of APIs that can be used to validate requests from the first inline frame.

18. A non-transitory computer-readable storage medium, the computer-readable storage medium including instructions that when executed by a computer, cause the computer to:
receive, at a host web page, a first object from a first inline frame of the host web page, the first object identifying a first Application Programming Interface (API);
validate, by the host web page, the first object against a predefined plurality of APIs for the host web page; and
in response to validating the first object, forward the first object to a second inline frame of the host web page, the second inline frame configured to parse the first object and translate the parsed first object to a second API corresponding to the second inline frame,
wherein the first inline frame comprises a web part item, the web part item comprising a server-side controlled application operating within the first inline frame, and wherein the second inline frame comprises a configuration pane of the host web page, the configuration pane configured to be rendered inside the second inline frame.

\* \* \* \* \*